US005660925A

United States Patent [19]

Cooley et al.

[11] Patent Number: 5,660,925

[45] Date of Patent: Aug. 26, 1997

[54] TAMPER-INDICATING AND AUTHENTICATING LABEL

[75] Inventors: Julian B. Cooley, Hudson, Wis.; Henry B. Clark, Roseville, Minn.

[73] Assignee: Minnesota Mining and Manufacturing Company, St. Paul, Minn.

[21] Appl. No.: 568,805

[22] Filed: Dec. 7, 1995

[51] Int. Cl.$^{6}$ .................................................. B32B 3/26

[52] U.S. Cl. ....................... 428/304.4; 428/195; 428/206; 428/321.1

[58] Field of Search .................................... 428/195, 206, 428/304.4, 321.1, 30; 136/156, 660

[56] References Cited

U.S. PATENT DOCUMENTS

| | | | |
|---|---|---|---|
| Re. 24,906 | 12/1960 | Ulrich | 206/59 |
| 3,389,827 | 6/1968 | Abere et al. | 220/53 |
| 3,453,358 | 7/1969 | Hartman | 264/321 |
| 4,080,348 | 3/1978 | Korpman | 260/27 BB |
| 4,136,071 | 1/1979 | Korpman | 260/27 BB |
| 4,181,752 | 1/1980 | Martens et al. | 47/54.1 |
| 4,299,880 | 11/1981 | Arens | 428/304 |
| 4,374,889 | 2/1983 | Arens | 428/207 |
| 4,428,321 | 1/1984 | Arens | 116/217 |
| 4,539,256 | 9/1985 | Shipman | 428/315.5 |
| 4,613,544 | 9/1986 | Burleigh | 428/315.5 |
| 4,729,687 | 3/1988 | Arens | 401/198 |
| 4,733,786 | 3/1988 | Emslander | 215/230 |
| 4,792,584 | 12/1988 | Shiraki et al. | 524/77 |
| 4,833,179 | 5/1989 | Young et al. | 522/183 |
| 4,834,552 | 5/1989 | Makowka | 383/5 |
| 4,846,095 | 7/1989 | Emslander | 116/206 |
| 4,877,253 | 10/1989 | Arens | 273/240 |
| 4,952,650 | 8/1990 | Young et al. | 526/194 |
| 5,153,042 | 10/1992 | Indrelie | 428/40 |
| 5,354,598 | 10/1994 | Arens | 428/195 |
| 5,389,426 | 2/1995 | Arens et al. | 428/195 |

FOREIGN PATENT DOCUMENTS

| | | | |
|---|---|---|---|
| 0 651 365 A1 | 5/1995 | European Pat. Off. | G09F 3/02 |
| WO91/04199 | 4/1991 | WIPO | B65D 33/34 |

OTHER PUBLICATIONS

Bruce N. McBane and Rostyslaw Dowbenko, *Pittmentized Coatings Based on Microporous Films Obtained by Solvent Extraction*, Ind. Eng. Chem., Prod. Res. Develop., vol. 13, No. 1, 1974 (pp. 33–37).

*Primary Examiner*—William Krynski

*Attorney, Agent, or Firm*—Gary L. Griswold; Walter N. Kirn; James J. Trussel

[57] ABSTRACT

A tamper-indicating and authenticating label which provides a temporary visually perceptible indication that the label is authentic, and provides a permanent indication of tampering with the label. The label comprises a normally opaque microporous film which becomes substantially transparent upon application of a suitable liquid. The label includes tamper-indicating and authenticating indicia which are normally not visually perceptible when the microporous film is opaque, and which become visible when the microporous film is made transparent. The authenticating indicia is made temporarily visible to authenticate the label by applying a volatile liquid to the film to render it transparent, without dissolving the tamper-indicating indicia. Application of solvents in an attempt to defeat the adhesive of the label will cause the tamper-indicating indicia to bleed through to the surface of the label, providing a permanent indication of tampering. Application of high temperature in an attempt to defeat the adhesive of the label will collapse the microvoids of the film, permanently transparentizing the film and causing the tamper-indicating indicia be permanently visible. Application of oil in an attempt to defeat the adhesive of the label will permanently transparentizing the film and cause the tamper-indicating indicia be permanently visible. The microporous film can either be stretchy and permanently deformable, or brittle and easy to tear or break, to provide additional permanent indication of tampering.

23 Claims, 2 Drawing Sheets

TAMPER-INDICATING AND AUTHENTICATING LABEL

This invention was made with Government support under a contract awarded by the Government. The Government has certain rights in the invention.

TECHNICAL FIELD

The present invention relates to a tamper-indicating and authenticating label which provides a temporary visually perceptible indication that the label is authentic, and provides a permanent indication of tampering with the label. The label comprises a normally opaque microporous film which becomes substantially transparent upon application of a suitable liquid. The label includes both tamper-indicating and authenticating indicia which are normally not visually perceptible when the microporous film is opaque, and which become visible when the microporous film is made transparent.

BACKGROUND OF THE INVENTION

Microporous films or membranes have a structure that enables fluids to flow through them. The effective pore size is at least several times the mean free path of the flowing molecules, namely from several micrometers down to about 100 Angstroms. Such films are generally opaque, even when made of a transparent material, because the surfaces and the internal structure scatter visible light. When the pores are filled with a material, typically a liquid, having an index of refraction sufficiently close to that of the film material, the film can be made substantially transparent. Upon removal of the liquid, such as by evaporation, the microporous film again becomes opaque. This property of microporous films is well known in the art. Bruce N. McBane and Rostyslaw Dowbenko, *Pittmentized Coatings Based on Microporous Films Obtained by Solvent Extraction*, Ind. Eng. Chem. Prod. Res. Develop., Vol. 13, No. 1, at 33–37 (1974).

It has been recognized that indicia can be hidden by an opaque microporous film, and that the indicia can be rendered visible by wetting the microporous film out with a liquid to fill the micropores and rendering the film transparent. U.S. Pat. No. 4,846,095 "Critical Temperature Indicating Device" (Emslander) teaches a device for indicating a critical temperature. A microporous sheet is exposed to a mixture comprising two liquids which is incapable of wetting out the film at a given temperature, but capable of wetting the film at a critical temperature. At the critical temperature, the components of the mixture separate, allowing one of the liquids to irreversibly wet the film. Emslander does not suggest the use of the film in a security label, or the ability to provide both a temporary indication of authenticity and a permanent indication of tampering.

It has been recognized in U.S. Pat. No. 4,374,889, "Oil-Repellent Microvoid-Imaging Material" (Arens), that when a sheet material having a transparentizable opaque microvoid containing layer is transparentized with a relatively non-volatile material such as oil, a permanent mark may remain. Arens teaches a dark-colored substrate having a microvoid containing layer on both the front surface (working surface) and back surface. The front surface is treated with oleophobic fluorocarbons to prevent oil from penetrating and transparentizing the front surface. The back surface of an adjoining sheet can be contacted against the front surface to blot away oil from the from surface to prevent permanent marks. Arens does not suggest the use of microvoid containing layers in a security label adhered to an article. Furthermore, Arens teaches how to prevent permanent marks caused by oil, rather than providing a permanent indication of tampering in response to the application of oil.

It is known that a normally opaque microporous film can be rendered transparent by the application of a sufficiently high temperature to the film. The high temperature causes the microvoids to substantially collapse, reducing the internal reflection of light caused by the microvoids. It has been recognized that this property of microporous films can be used to provide an indication of tampering by the application of heat. U.S. Pat. No. 4,733,786, "Container and Innerseal Capable of Indicating Heat Tampering" (Emslander) discloses an innerseal for bottles or other containers comprising a facing layer for adhering to a container opening, an insulating layer adhered to the facing layer, and a thermally sensitive layer adhered to the insulating layer. In one embodiment, the thermally sensitive layer is normally opaque, and becomes substantially transparent upon application of heat to the innerseal. When the thermally sensitive layer is transparent, messages which have been printed on the facing layer, the insulating layer, or the side of the thermally sensitive layer adjacent the insulating layer become visible. The message is normally not visible when the thermally sensitive layer is opaque. The message provides an indication of heat tampering when the thermally sensitive layer is transparent. One preferred thermally sensitive layer taught by Emslander is the microporous sheet material disclosed in U.S. Pat. No. 4,539,256 "Microporous Sheet Material, Method of Making and Articles Made Therewith," (Shipman). However, Emslander does not suggest a security label which is temporarily transparentized with a liquid to authenticate the label, nor does Emslander suggest using a soluble tamper-indicating indicia which permanently bleeds through the thermally sensitive layer upon tampering with a solvent.

U.S. Pat. No. 5,389,426, "Article for Use in Forming a Permanent Image Using a Temporary Marker" (Arens et al.), discloses a porous material having a top surface and a bottom surface, and a dye applied to the bottom surface of the porous material. The dye is soluble in a volatile imaging liquid, such that when the volatile liquid contacts the top surface of the porous material, the volatile liquid penetrates the material, dissolves at least some of the dye to provide a dye solution, with at least some of the dye solution migrating to the top surface. When the volatile liquid evaporates, a permanently visible mark of dye residue remains on the top surface of the porous material. The dye may be of any composition, provided that the dye is soluble in the imaging liquid. Arens et al. discloses that the porous material may be of any construction provided the porosity permits the imaging liquid to penetrate the porous material from the top surface and reach the dye below. In one embodiment, Arens et al. teaches that the porous material is preferably any type of porous paper such as Mead 20 lb. coated front paper, NCR 20 lb. coated paper, or standard 50 lb. offset paper. In another embodiment, Arens et al. teaches that the transparentizable microporous layer comprises particles having an index of refraction from about 1.3 to 2.2 incorporated in a binder which has an index in the same range as the particles, with interconnected microvoids being present throughout the layer. Arens et at. also teaches that in embodiments in which the porous material is rendered transparent by the volatile liquid, there will be a visible indication that is a combination of two components. There will be a temporary component caused by rendering the porous material transparent allowing the dye to be viewed through the material, and after a sufficient amount of time, a permanent component caused by dye which has migrated to the top surface. Upon evaporation of the liquid, the porous material will no longer be transparent, and only the permanent component of the indication will remain visible. However, Arens et at. does not teach applying two indicia to the bottom surface of the material, one to provide a temporary indication which does not bleed through the material upon application of a liquid which does not cause the second indicia to bleed through, and a second which will provide a permanent indication by bleeding through the material upon application of selected solvents.

Thus, it is seen that there is no suggestion in the art to provide a tamper-indicating and authenticating label which provides a temporary visually perceptible indication that the label is authentic, and provides a permanent indication of tampering with the label, the label comprising a normally opaque microporous film which becomes substantially transparent upon application of a suitable liquid and which includes tamper-indicating and authenticating indicia which are normally not visually perceptible when the microporous film is opaque, and which become visible when the microporous film is made transparent.

SUMMARY OF THE INVENTION

The inventive tamper-indicating and authenticating label of the present invention comprises a microporous film, authenticating indicia, and tamper-indicating indicia, and provides:

a) a temporary visually perceptible indication that the label is authentic by applying a volatile liquid to the film to render it temporarily transparent, without dissolving the tamper-indicating indicia; and b) a permanent visually perceptible indication of tampering with the label caused by any one or a combination of four methods of tampering:

i) application of solvents in an attempt to defeat the adhesive of the label will cause the tamper-indicating indicia to bleed through to the surface of the label, providing a permanent indication of tampering;

ii) application of high temperature in an attempt to defeat the adhesive of the label will collapse the microvoids of the film, permanently transparentizing the film and causing the tamper-indicating indicia be permanently visible;

iii) application of oil in an attempt to defeat the adhesive of the label will permanently transparentize the film and cause the tamper-indicating indicia be permanently visible, and may also cause the tamper-indicating indicia to bleed through to the surface;

iv) mechanical pulling or peeling the label to remove it from an article is indicated by forming the microporous film to be either stretchy and permanently deformable, or brittle and easy to tear or break.

One aspect of the present invention presents an authenticatible, tamper-indicating label comprising a normally opaque, transparentizable microporous film having first and second major surfaces, a first indicia, a second indicia proximate the first surface, and an adhesive proximate the first surface. The microporous film can be changed from an opaque state to a transparent state by application of a first liquid that is not a solvent for the first and second indicia to the microporous film to thereby sufficiently fill the pores of the microporous film to cause the film to become transparent. When the microporous film is in its opaque state, the first and second indicia are not visually perceptible when the label is viewed from the second surface. When the microporous film is in its transparent state, at least the first indicia is visually perceptible when the label is viewed from the second surface, thereby providing an indication of the authenticity of the label. Application of a second liquid that is a solvent for the second indicia causes at least a portion of the second indicia to migrate through the microporous film to the second major surface, thereby providing a permanent visually perceptible indication of tampering. The first and second indicia can be distinct from one another, or there can be a combined indicia that serves as both the authenticating indicia and the tamper-indicating indicia.

In various embodiments of the above label, the second indicia is soluble in hydrocarbons, ketones, or alcohols, and the first indicia is insoluble in water or trichloroethylene.

The microporous film of the above label can comprise a polymeric film including a plurality of interconnected pores therein and a plurality of polymeric particles interconnected by fibrils extending between adjacent particles. The polymeric material can comprise, for example, polypropylene, polyethylene, or ethylene vinyl alcohol copolymer.

The application of a volatile liquid to the above label causes the first indicia to be temporarily visually perceptible through the microporous film, thereby providing a temporary indication of the authenticity of the label. The application of a sufficiently high temperature to the label so as to collapse the pores of the microporous film permanently changes the film from said opaque state to the transparent state, thereby causing the second indicia to be permanently visually perceptible through the microporous to provide a permanent indication of tampering.

To provide an easily deformable film in the above label, in one preferred embodiment, the microporous film has a tensile strength of at least 750 psi and exhibits at least 100% tensile elongation at tensile failure. In another embodiment, the microporous film has a tensile strength of at least 1200 psi and exhibits at least 200% tensile elongation at tensile failure. To provide a brittle, easily torn label, the microporous film has a tensile strength of no greater than 3500 psi and exhibits no more than 30% tensile elongation at tensile failure. In another embodiment, the microporous film has a tensile strength of no greater than 1000 psi and exhibits no more than 20% tensile elongation at tensile failure.

Another aspect of the present invention presents an authenticatible, tamper indicating system, comprising an article having an exposed surface; an authenticatible, tamper-indicating label adhered to the article, the label including a normally opaque, transparentizable microporous film having first and second major surfaces and an adhesive, wherein the label is adhered to the exposed surface of the article with a first bond strength by the adhesive such that the first major surface is facing the article; and first and second indicia. The microporous film can be changed from an opaque state to a transparent state by application of a first liquid that is not a solvent for the first and second indicia to the microporous film to thereby sufficiently fill the pores of the microporous film to cause the film to become transparent. When the microporous film is in its opaque state, the first and second indicia are not visually perceptible when the label is viewed from the second surface, and when the microporous film is in its transparent state, at least the first indicia is visually perceptible when the label is viewed from the second surface, thereby providing an indication of the authenticity of the label. Application of a second liquid that is a solvent for the second indicia to the label causes at least a portion of the second indicia to migrate through the microporous film to the second major surface, thereby providing a permanent visually perceptible indication of tampering.

In one preferred embodiment of the system, the microporous film has a tensile strength greater than the first bond strength and the microporous film exhibits at least 100% elongation at tensile failure. In a variation of this aspect, the microporous film exhibits at least 200% elongation at tensile failure.

In another preferred embodiment of the system, the microporous film has a tensile strength less than the first bond strength and the microporous film exhibits no more than 30% elongation at tensile failure. In a variation of this aspect, the microporous film exhibits no more than 20% elongation at tensile failure.

Certain terms are used in the description and the claims that, while for the most part are well known, may require some explanation. It should be understood that, when referring to the microporous film as being "opaque," this means that the film is either completely opaque, or sufficiently opaque to prevent the indicia on the back of the film from being visually perceptible under ordinary viewing conditions. It should be understood that, when referring to the microporous film as being as being "transparent," this means that the film is completely transparent, or sufficiently translucent to allow indicia on the back of the film to be readily viewed through the film under ordinary viewing conditions.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 1:
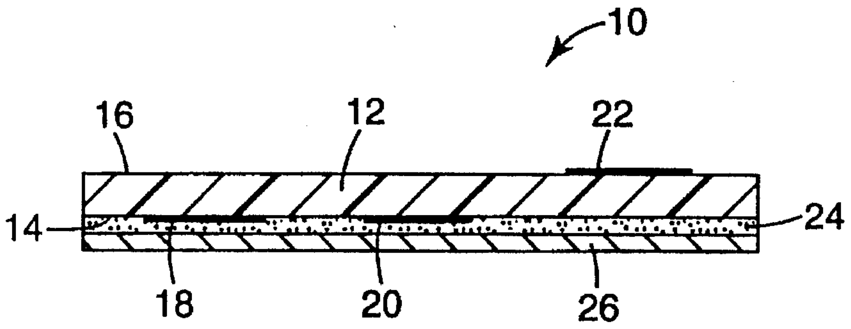
FIG. 1 is a cross-sectional view of a tamper indicating and authenticating label according to the present invention.

Refer now to FIG. 1, in which there is illustrated a cross-sectional view of a tamper-indicating and authenticating label 10 according to the present invention. Label 10 comprises a microporous film 12 having first major surface 14 and second major surface 16. On first major surface 14 is a suitable means for adhering the label 10 to an article. As illustrated in FIG. 1, a layer of adhesive 24 is present on first major surface 14 of the microporous film 12. An optional release liner 26 may be present over adhesive 24 as is well known in the art and is preferred when adhesive 24 is a pressure sensitive adhesive to prevent the label from inadvertently adhering to any object until the liner 26 is removed.

Adhesives useful in the preparation of an adhesive coated labelstock according to the present invention include both pressure sensitive and non-pressure sensitive adhesives, such as hot melt and cured adhesives. Pressure sensitive adhesives are normally tacky at room temperature and can be adhered to a surface by application of, at most, light finger pressure, while non-pressure sensitive adhesives include solvent, heat, or radiation activated adhesive systems. Pressure sensitive adhesives are a preferred class of adhesives for use in the present invention. Examples of adhesives useful in the invention include those based on general compositions of polyacrylate; polyvinyl ether; diene-containing rubber such as natural rubber, polyisoprene, and polyisobutylene; polychloroprene; butyl rubber; butadiene-acrylonitrile polymer; thermoplastic elastomer; block copolymers such as styrene-isoprene and styrene-isoprene-styrene block copolymers, ethylene-propylene-diene polymers, and styrene-butadiene polymer; poly-alpha-olefin; amorphous polyolefin; silicone; ethylene-containing copolymer such as ethylene vinyl acetate, ethylacrylate, and ethyl methacrylate; polyurethane; polyamide; epoxy; polyvinylpyrrolidone and vinylpyrrolidone copolymers; polyesters; and mixtures of the above. Additionally, the adhesives can contain additives such as tackifiers, plasticizers, fillers, antioxidants, stabilizers, pigments, diffusing particles, curatives, and solvents.

A general description of useful pressure sensitive adhesives may be found in *Encyclopedia of Polymer Science and Engineering*, Vol. 13, Wiley-Interscience Publishers (New York, 1988). Additional description of useful pressure sensitive adhesives may be found in *Encyclopedia of Polymer Science and Technology*, Vol. 1, Interscience Publishers (New York, 1964).

Other pressure sensitive adhesives useful in the invention are described in the patent literature. Examples of these patents include U.S. Pat. No. Re.24,906 (Ulrich); U.S. Pat. No. 3,389,827 (Abere et al.) at Col. 4-Col. 5; U.S. Pat. No. 4,080,348 (Korpman); U.S. Pat. No. 4,136,071 (Korpman); U.S. Pat. No. 4,181,752 (Martens et al.); U.S. Pat. No. 4,792,584 (Shiraki et al.); U.S. Pat. No. 4,833,179 (Young et al.); and U.S. Pat. No. 4,952,650 (Young et al.). Commercially available adhesives are also useful in the invention. Examples include those adhesives available from 3M Company, St. Paul, Minn.; H.B. Fuller Company, St. Paul, Minn.; and Century Adhesives Corporation, Columbus, Ohio.

Figure 2:
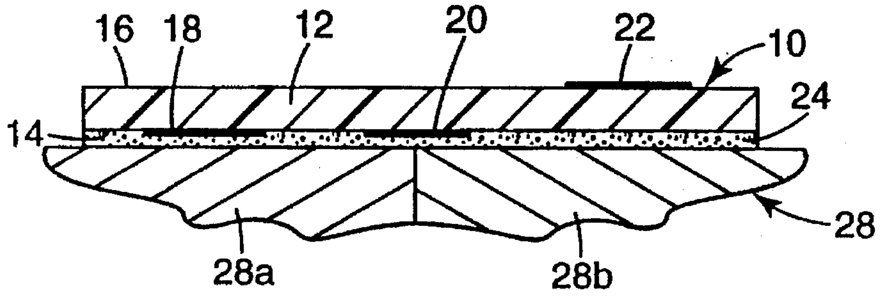
FIG. 2 is a cross-sectional view of the label of FIG. 1 adhered to an article.

As illustrated in FIG. 2, label 10 can be adhered to article 28, thus providing a system comprising an article 28 in combination with the tamper-indicating, authenticatible label 10. Article 28 can be any article for which there is a desire to determine if there has been tampering. For instance, article 28 can be an envelope, package, or other container, to which label 10 has been adhered across two components **28*a* and 28*b* movable relative to one another, such as the closure flap and body of a container. In such an arrangement, a user will be able to determine whether the label 10 has been tampered with or removed to gain access to the article as described below. It is also possible to incorporate label 10 as a component of such an article. Other suitable uses include automobile trunks during the manufacture and shipping stages, aircraft cargo holds, and the like. Label 10 can also be applied directly to the surface of a packaging container or an article without extending across two components movable relative to one another. For example, label 10** can be applied to communications equipment; computers, including peripheral equipment and accessories; electronics; industrial products; retail products; automobiles; and goods or packages being transported or shipped. These examples of applications are meant to be illustrative and not limiting.

The microporous film 12 can be any suitable microporous, diffusely light-reflective film which can be made increasingly translucent or transparent by filling its voids with a material having an index of refraction close to that of the material of the film. The microporous film 12 is preferably opaque, or nearly so, prior to filling its voids with an appropriate transparentizing material.

The microporous film 12 is initially opaque, or nearly so, because it is diffusely-reflective when its voids are filled with a material which has an index of refraction sufficiently different from the index of refraction of film material. Typically, the voids are initially filled with air. When a suitable transparentizing material, typically a liquid, is applied to the microporous film 12, it fills the voids of the microporous film 12, thereby displacing air from the voids. The transparentizing material and the material of the microporous film 12 are chosen to have sufficiently similar indices of refraction such that the microporous film 12 becomes increasingly light transmissive as the liquid substantially fills the voids of the film. If the indices of refraction of the transparentizing liquid and the material of the microporous layer 12 are sufficiently similar, the microporous film 12 can become substantially transparent as the transparentizing liquid fills the pores.

Figure 3:
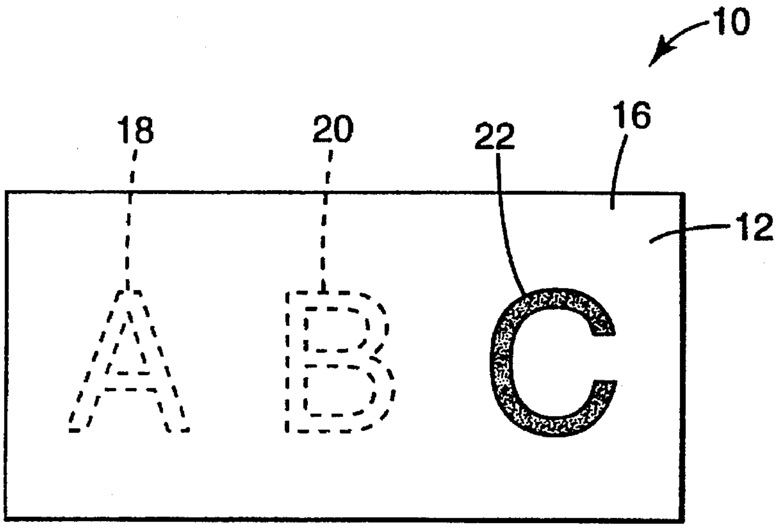
FIG. 3 is a plan view of the label of FIG. 1, in which first and second indicia are not visually perceptible, and a third indicia is visually perceptible.

In one preferred embodiment, label 10 includes first indicia, or authenticating indicia, 18 and second indicia, or tamper indicating indicia, 20 on the first surface 14 of microporous film 12. The first and second indicia are normally not visually perceptible through the microporous film 12 when the microporous film is in its opaque state. Label 10 can optionally include third indicia 22 on second major surface 16 of the microporous fill 12. Third indicia 22 will be permanently perceptible because it is on the exposed surface of the label 10. This is seen in FIG. 3, in which first and second indicia 18 and 20 are not visually perceptible through the label 10 when looking at second major surface 16, and in which third indicia 22 is visually perceptible. For clarity, third indicia 22 is simply illustrated as the letter "C". However, it should be understood that third indicia 22 can comprise any suitable pattern, such as a bar code, company logo, alpha-numeric characters such as a product identification, or the like.

Figure 4:
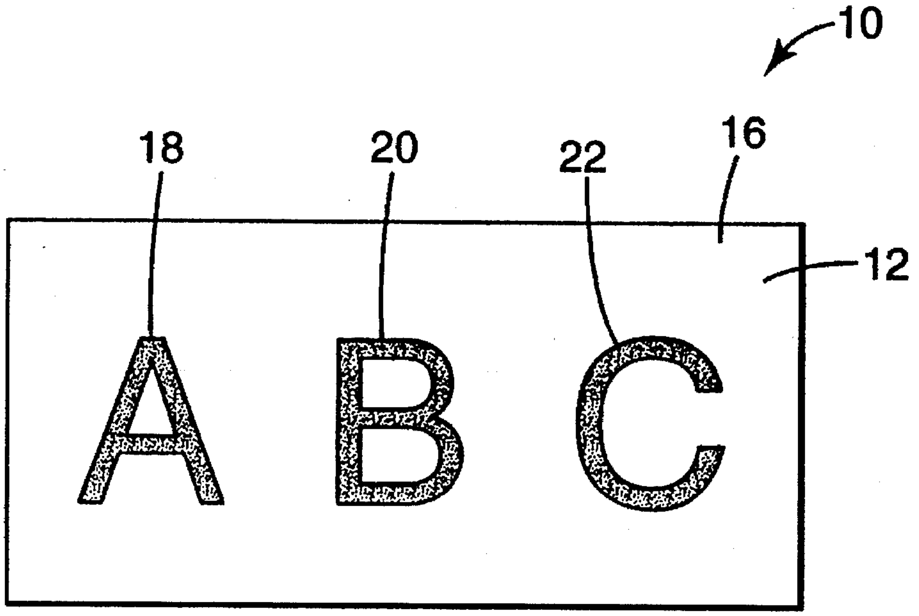
FIG. 4 is a plan view of the label of FIG. 1, in which first, second, and third indicia are visually perceptible.

First indicia 18 is rendered visually perceptible (as is second indicia 20) when a transparentizing liquid is applied to the label 10, thereby rendering the microporous film transparent, or substantially so, as illustrated in FIG. 4. According, the label 10 is an authenticating label in that a user can cause the microporous film 12 to become transparent, thereby allowing the user to see the first indicia, or authenticating indicia 18. For clarity, first indicia 18 is simply illustrated as the letter "A". However, it should be understood that the first indicia 18 can preferably be selected to be of any desired pattern, alpha-numeric characters, logo, or the like, so as to provide an indication to the user that the label is authentic, and not a substituted counterfeit label. The transparentizing liquid for performing the authenticating function should preferably be a volatile liquid, so as to evaporate over time, thereby returning the microporous film 12 to its opaque state, and again obscuring the first indicia 18 from view, as seen in FIG. 3. Suitable materials for authenticating indicia 18 include water insoluble inks when the transparentizing fluid for authentication is water. Such water insoluble inks include Flexo Poly Reflex Blue FA 20775, available from Flint Ink of Detroit Mich. When trichloroethylene is the transparentizing liquid, first indicia 18 can comprise Flexo Fluorescent Red FA-22838 or Flexo 466-U Brown RVN-24853, both available from Flint Ink. Authenticating indicia 18 can also comprise a metallized indicia which is resistant to the transparentizing liquid. Additionally, it is possible that authenticating indicia 18 be on the article 28 itself, or on an additional substrate bonded to the first surface 14 of the film 12.

It is also possible to add microparticles to the microporous film 12 during fabrication. The particles can be viewed at sufficient magnification (for example 100×) to provide an additional indication the label 10 is authentic. The microparticles can comprise, for example, microtaggant colored particles and colored glass beads as is known in the art.

The second, or tamper-indicating indicia 20 provides a permanent indication that the label 10 has been tampered with in some way. Typical methods of tampering include attempts to remove surreptitiously the label 10 from an article 28 and subsequently reapply the label without causing apparent change or damage to the label. This generally involves an attempt to reduce or release the adhesive bond between the adhesive layer 24 and the article 28. This can be done by applying solvents to the label in an attempt to dissolve the adhesive 24, applying oil to the label 10 in an attempt to render the adhesive non-tacky, and applying a high temperature to the label in an attempt to render the adhesive 24 non-tacky. Each of these methods is often combined with an attempt to mechanically pull or peel the label from the article 10.

Figure 5:
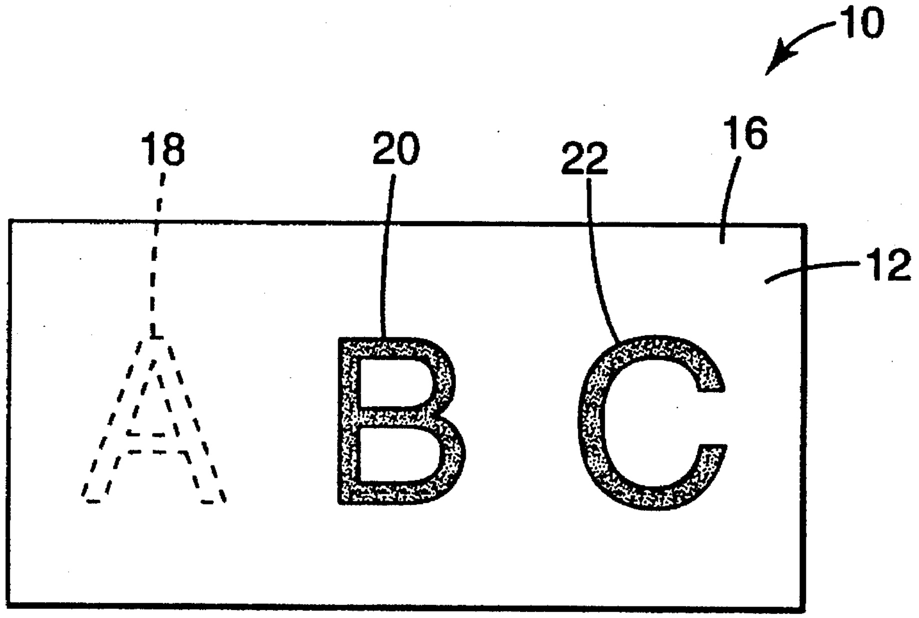
FIG. 5 is a plan view of the label of FIG. 1, in which the first indicia is not visually perceptible, and in which the second and third indicia are visually perceptible.

The second indicia 20 should comprise a material which is soluble in most solvents used to dissolve the adhesive 24. When a solvent is then applied to the label, at least a portion of the second indicia 20 will bleed through the microporous film 12, and become permanently visually perceptible on the second major surface 16 of the film. When the solvent is initially applied, it may transparentize the microporous film 12, as described above with respect to the authenticating function illustrated in FIG. 4. When the solvent evaporates, the microporous film will again become opaque. However, the portion of the second indicia which has bled through to the second major surface 16 will remain permanently visually perceptible, as illustrated in FIG. 5. The second indicia should be selected however, so as not to be soluble in the transparentizing liquid chosen for the authenticating function described above. The authenticating function should be performed so as to render first indicia 18 temporarily visually perceptible, without causing the second indicia 20 to bleed through to the second major surface 16.

Second indicia 20 may be chosen to be soluble in most oils and the like which are used to attempt to render the adhesive 24 non-tacky. In case of such tampering, the second indicia 20 will bleed through to the first major surface 16 as described above, thereby providing a permanent indication of tampering. As an additional or alternative indication to tempering with oil, oils are generally non-volatile, and will therefore not evaporate from the label with time. This will render the microporous film permanently transparent. Accordingly, the second, or tamper-indicating, indicia 20 will provide a permanent, visually perceptible indication of tampering for as long as the oil remains in the pores, whether or not the second indicia 20 was soluble in the oil.

Suitable materials for second indicia 20 include solvent red #027 or solvent blue #027 dye powder from Spectra of Kearney, N.J. These dyes are soluble in ketones, alcohols, and hydrocarbons that are typically used in an attempt to defeat adhesives. This dye is not soluble in water, and is suitable for use when the first indicia is water insoluble, and water is to be used as the transparentizing liquid. Other suitable materials for second indicia 20 include Flexo Fluorescent Red FA-22838 or Flexo 466-U Brown RVN-24853, both available from Flint Ink, and Macrolex Blue R (solvent blue #97) from Verona Corporation. These inks are soluble in methanol, acetone, and methyl ethyl ketone, which may be used in an attempt to remove surreptitiously the label 10. These inks are not soluble in trichloroethylene, and are therefore suitable for use as the second indicia when the transparentizing fluid is to be trichloroethylene.

When a high temperature is applied to the tamper indicating label 10 in an attempt to remove the adhesive 24 from the article 28, this will cause the voids in the microporous film to collapse. This will cause the microporous film 12 to become permanently transparent. In this case, the second indicia 20 will be permanently visually perceptible, providing an indication that the label 10 has been tampered with.

For clarity, second indicia 20 is simply illustrated as the letter "B". However, it should be understood that the second indicia 20 can be chosen to be any pattern, alpha-numeric combination, or logo, to provide a user with an indication that the label 10 has been tampered with. Second indicia 20 is preferably a message such as "VOID" or "TAMPERED", or a pattern such as diagonal slashes or the like which can optionally overlap the first indicia 18. Alternatively, second indicia 20 can be mixed with adhesive 24.

As illustrated herein, one preferred embodiment of label 10 includes separate and distinct first and second indicia 18 and 20. Providing distinct indicia allows for the first indicia to be a difficult to copy pattern or logo, or alpha-numeric combination, that will provide a user an indication that the label 10 is not counterfeit and allows for the second indicia to be an obvious indication of tampering, such as the word "VOID" or some suitable pattern that will overlap or obscure the first indicia. It is also within the scope of the invention that the authenticating and tamper-indicating indicia be a single, or combined, indicia. In such an a label, this combined indicia must be insoluble in the transparentizing fluid while being soluble to most solvents typically used in attempts to remove a label. The configuration of such a combined indicia can be chosen to provide an indication of authenticity upon rendering the label temporarily transparent, and a permanent indication of tampering when the user observes that the indicia remains visible for an extended period of time.

As stated above, attempts to defeat the adhesive 24 are often combined with a mechanical pulling or peeling of the label 10 to remove it from the article 26. Accordingly, the microporous film 12 can preferably be chosen to either substantially stretch and deform when pulled from the article or to be brittle so as to break or tear when pulled from the article. Either of these characteristics will provide a permanent indication of tampering.

When it is desired to have a label 10 that will substantially stretch and deform upon an attempt to remove the label from the article 28, the material of the microporous film 12 should be chosen to have substantial elongation at tensile failure. The tensile strength of the film is preferably less than or approximately equal to the strength of the bond between the label 10 and the article 28, such that the label will undergo substantial plastic deformation and tensile failure before the adhesive bond is broken. The tensile strength can instead be somewhat greater than the bond strength, provided the label is substantially deformed before the adhesive bond is broken. One preferred material for a microporous film which will substantially stretch and deform is polyethylene. Such films preferably have a tensile strength of approximately 800–1200 psi and a percent strain at tensile failure of between approximately 100–250%. Such measurements are taken in accordance with ASTM D 882–83, using a 5 inch per minute pull and 1 inch wide samples. It should be understood that such values are exemplary and non-limiting, and can be varied to obtain the desired results, keeping in mind the particular adhesive 24 employed, the surface of the article 28 to which the label will be adhered, and the strength of the bond between the label and the article, both tampered and untampered.

When it is desired to use a more brittle label 10 that will break or tear upon attempt to remove it from the article 28, the material of the microporous film 12 should be chosen to have a tensile strength less than the strength of the bond between the label 10 and the article 28, and to have relatively low percent elongation at tensile failure. For such an application, it has been found that polypropylene microporous films and ethyl vinyl alcohol copolymer (EVOH) microporous films are suitable. Suitable polypropylene flims preferably have a tensile strength of approximately 300–800 psi and a percent strain at tensile failure of approximately 5–15%. Suitable EVOH films preferably have a strength of approximately 2500–3500 psi and a percent strain at tensile failure of approximately 20–30%. As with the stretchable films discussed above, it should be understood that such values are exemplary and non-limiting, and can be varied to obtain the desired results, keeping in mind the particular adhesive 24 employed, the surface of the article 28 to which the label will be adhered, and the strength of the bond between the label and the article, both tampered and untampered.

Preferred microporous films include those described in U.S. Pat. No. 4,539,256, "Microporous Sheet Material, Method of Making and Articles Made Therewith," (Shipman), the entire disclosure of which is incorporated herein by reference. Crystallizable polymers suitable for use in the preparation of such microporous films are well known and readily commercially available. The useful polymers are melt processable under conventional processing conditions. That is, on heating they will easily soften and/or melt to permit processing in conventional equipment such as an extruder to form a sheet. Crystallizable polymers, upon cooling their melt under controlled conditions, spontaneously form geometrically regular and ordered chemical structures. Preferred crystallizable polymers have a high degree of crystallinity.

Particularly preferred are polyethylene microporous films and polypropylene microporous films made generally in accordance with the teachings of Shipman in which the blending compound has been removed from the microporous film to provide a film comprising the polymeric material itself. It is also possible to employ a film in which the blending compound has not been removed, in which case the transparentizing liquid must be chosen so as to be able to fill the voids of the film despite the presence of the blending compound.

The process of forming microporous films according to Shipman generally includes:

(a) melt blending to form a solution comprising 30 to 80 parts by weight of crystallizable thermoplastic polymer with 70 to 20 parts by weight of compound with which the thermoplastic polymer is miscible and in which the thermoplastic polymer will dissolve at the melting temperature of the thermoplastic polymer and from which the thermoplastic polymer will phase separate on cooling to a temperature at or below the crystallization temperature of the thermoplastic polymer;

(b) forming a film of the melt blended solution;

(c) cooling the film to a temperature at which the thermoplastic polymer crystallizes to cause phase separation to occur between the thermoplastic polymer and the compound thereby to provide an article comprising an aggregate of a first phase comprising particles of crystallized thermoplastic polymer in a second phase comprising the compound with adjacent thermoplastic polymer particles being distinct but having a plurality of zones of continuity;

(d) orienting the film at least in one direction to separate adjacent particles of crystallized thermoplastic polymer from one another to provide a network of interconnected micropores therebetween and to permanently attenuate the thermoplastic polymeric material in the zones of continuity to form fibrils; and (e) optionally removing the compound from the film, e.g., by solvent extraction.

The formed article, before orientation, is solid and generally transparent comprising an aggregate of a first phase of particles of crystallized thermoplastic polymer in a second phase of the additive compound. The particles may be described as spherulites and aggregates of spherulites of the polymer with additive compound occupying the space between particles. Adjacent particles of polymer are distinct but they have a plurality of zones of continuity. That is, the polymer particles are generally surrounded or coated by the compound but not completely. There are areas of contact between adjacent polymer particles where phase separation has not occurred and there is a continuum of polymer from one particle to the next adjacent particle in such zones of continuity.

On orienting or stretching, the polymer particles are pulled apart, permanently attenuating the polymer in the zones of continuity thereby forming the fibrils and forming minute voids between coated particles, creating a network of interconnected micropores, thereby rendering the article permanently translucent. On orienting or stretching, the compound remains coated on or surrounds, at least partially, the surfaces of the resultant thermoplastic polymer particles. The degree of coating, of course, depends upon the affinity of the compound for the surface of the polymer particle, whether the compound is a liquid or solid, whether orientation dislodges or disrupts the coating and on other factors which may be relevant. The particles are usually at least partially coated after orientation. Substantially all of the particles appear to be connected by fibrils. The size of the micropores is easily controlled by varying the degree of stretching, percent of additive compound, melt-quench conditions, compound removal and heat-stabilization procedures. The fibrils for the most part do not appear to be broken by stretching but they are permanently stretched beyond their elastic limit so that they do not elastically recover to their original position when the stretching force is released. As used herein, "orienting" means such stretching beyond the elastic limit so as to introduce permanent set or elongation of the article.

When fabricated as a film, the resulting article has a microporous structure characterized by a multiplicity of spaced (i.e. separated from one another), randomly dispersed, non-uniform shaped, equiaxed particles of thermoplastic polymer coated with the compound and connected by fibrils. (Equiaxed means having approximately equal dimensions in all directions.)

The melting and crystallization temperature of a thermoplastic polymer, in the presence of a blending compound or additive, is influenced by both an equilibrium and dynamic effect. At equilibrium between liquid and crystalline polymer, thermodynamics requires that the chemical potentials of the polymer repeating unit in the two phases must be equal. The temperature at which this condition is satisfied is referred to as the melting temperature, which will depend on the composition of the liquid phase. The presence of impurities (such as a blending compound or additive) in the liquid phase will lower the chemical potential of the polymer repeating units in that phase. Therefore, a lower melting temperature is required to re-establish the condition of equilibrium, resulting in what is known as a melting temperature depression.

The crystallization temperature and melting temperature are equivalent at equilibrium. However, at non-equilibrium conditions, which are normally the case, the crystallization temperature and melting temperature are dependent on cooling and heating rate respectively. Consequently, the terms "melting temperature" and "crystallization temperature", when used herein, are intended to include the equilibrium effect of the blending compound or additive as well as the dynamic effect of the rate of heating or cooling.

Compounds suitable for blending with the crystallizable polymer to make the microporous materials taught by Shipman are liquids or solids at room temperature and in which the crystallizable polymer will dissolve to form a solution at the melting temperature of the crystallizable polymer but will phase separate on cooling at or below the crystallization temperature of the crystallizable polymer. Preferably, these compounds have a boiling point at atmospheric pressure at least as high as the melting temperature of the crystallizable polymer. Compounds having lower boiling points may be used in those instances where superatmospheric pressure may be employed to elevate the boiling point of the compound to a temperature at least as high as the melting temperature of the crystallizable polymer. Generally, suitable compounds have a solubility parameter and a hydrogen bonding parameter within a few units of the values of these parameters for the crystallizable polymer.

Some examples of blends of crystallizable polymers and blending compounds which are useful in preparing microporous films suitable for use in the present invention include: polypropylene with mineral oil, dioctyl phthalate or mineral spirits; polypropylene-polyethylene copolymer with mineral oil; and polyethylene with mineral oil or mineral spirits.

A particular combination of polymer and blending compound may include more than one polymer, i.e., a mixture of two or more polymers, and/or more than one blending compound. Mineral oil and mineral spirits are examples of mixtures of blending compounds since they are typically blends of hydrocarbon liquids. Blends of liquids and solids may also serve as the blending compound. It should be understood that the polymer may include blended therein certain conventional additive materials in limited quantity so as not to interfere with the formation of the microporous material and so as not to result in unwanted exuding of the additive. Such additives may include antistatic materials, dyes, plasticizers, UV absorbers, nucleating agents and the like. The amount of additive is typically less than 10% of the weight of the polymer component, preferably less than 2% by weight.

The melt is prepared by mixing 30 to 80% by weight of crystallizable thermoplastic polymer and 70 to 20% by weight of blending compound and heating the mixture to at least the melting temperature of the crystallizable polymer. For ease of handling the melt and in its casting, it is convenient to initiate the formation of the melt-blend solution by heating the mixture at a temperature in a range of about 25° C. to about 100° C. above the melting temperature of the crystallizable polymer.

Microporous films are prepared by casting a sheet or layer of a melt-blend solution comprising a crystallizable polymer and a blending compound and, depending on the particular polymer, cooling the article in a quench bath at an appropriate temperature preferably between about 60° C. and 225° C. below the equilibrium melting point of the pure crystallizable polymer to provide a proper cooling rate. (For example for pure polypropylene having an equilibrium melting point of 176° C., a cooling temperature between about 40° C. and 60° C. is employed.) Some minor degree of experimentation may be required to identify the appropriate temperature range which produces optimum phase separation for a particular polymer-blending compound system, this being well within the capability of one skilled in the art once apprised of the present disclosure.

The attainment of the desired microporous materials is dependent on the rate of cooling. During cooling, heat is removed from the melt-blend solution until the crystallization temperature of the crystallizable polymer is reached and solidification and phase separation of the polymer can begin. Cooling temperatures greater than about 225° C. below the equilibrium melting point of the pure crystallizable polymer cause too rapid quenching of the melt and can result in single phase films which, although strong, are substantially incapable of being rendered uniformly microporous by stretching. Cooling at temperatures of less than about 60° C. below the equilibrium melting point of the pure crystallizable polymer allows for too slow a phase separation (crystallization) of the crystallizable polymer with formation of large spherulites that results in articles which are weak. Casting articles or films which are too thick, i.e., thicker than 1,000 micrometers, to achieve the proper cooling rate as described above also allows for too slow a crystallization. These parameters can be varied to achieve a microporous film of desired tensile strength and percent elongation.

The melt-blend solution is obtained by feeding into the hopper of an extruder a mixture of crystallizable polymer and blending compound through the extruder which is heated, preferably with 3 zones heated at increasing temperatures toward the extruder exit to a slot die that has a slit gap of 25 to 1,000 micrometers. Preferably, the crystallizable polymer is fed into the hopper of the extruder and the blending compound is fed by a suitable device into the extruder via a port in the extruder wall intermediate the hopper and the extruder exit. It is also preferable to utilize a suitable mixing device such as a static mixer between the extruder exit and the slot die. In passing through the extruder, and, where used, the static mixer, the mixture of polymer and blending compound is heated to a temperature at or at least about 25° C. above the melting temperature of the crystallizable polymer (but below the thermal degradation temperature of the polymer) and mixed to form a melt-blend solution that is extruded through the slot die as a layer into a liquid quench bath maintained at a suitable temperature below the crystallization temperature of the crystallizable polymer using a suitable coolant, e.g., water. In some instances, e.g., for nylon and polyester, it is necessary to cool the solution in the extruder before it reaches the die to a temperature as much as 50° C. cooler than the equilibrium melting point of the pure polymer in order to obtain phase separation in the sheet. The cooled film is then led from the quench bath, to machine-direction orienting device, transverse direction orienting device and then to take-up roller. Orienting in two directions is, of course, optional.

The film is rendered microporous by stretching until micropores are permanently developed or formed, typically to obtain at least an increase in length (elongation) of about 10%. Stretching to provide an elongation of about 10% to about 1,000% is typical. The actual amount of stretching required will depend upon the particular composition of the article and the degree of porosity desired. Stretching may be provided by any suitable device which can provide stretching in at least one direction and may provide stretching both in that direction and in the transverse direction. Stretching should be uniform to obtain uniform and controlled porosity. Stretching in one direction typically causes the film to narrow or "neck" in the cross direction so stretching a film to provide an elongation of 50%, for example, does not produce a 50% increase in the surface area of the film.

The microporous films are preferably dimensionally stabilized according to conventional well known techniques by heating the oriented sheet while it is restrained at a heat stabilizing temperature.

The resulting microporous film is composed of randomly dispersed, equiaxed, irregularly shaped particles of thermoplastic polymer. Particles are spaced from one another to provide a network of micropores therebetween. Particles are connected to each other by fibrils which radiate from each particle to the adjacent particles.

The blending compound may be removed from the microporous film to provide a microporous film formed of the polymeric material per se. Removal may be by solvent extraction, volatilization, or any other convenient method. This removal may be preferable to facilitate the application of the transparentizing liquid to perform the authenticating function described above.

Another useful microporous film is a microporous ethylene-vinyl alcohol copolymer (EVOH) film. The copolymer preferably has an internal structure of a multiplicity of spaced, randomly dispersed, non-uniform shaped particles of ethylene-vinyl alcohol copolymer. Preferably, the particles are joined together by fibrils. The EVOH film can be prepared by (a) melt blending a mixture of ethylene-vinyl alcohol copolymer and a compatible polymer or compound in which the copolymer will dissolve to form a solution at the melting temperature of the copolymer, but will phase separate on cooling at or below the crystallization temperature of the ethylene-vinyl alcohol copolymer, (b) forming a film of the melt blended mixture; (c) cooling the film to a temperature to cause phase separation to occur between the compatible copolymer or compound and the ethylene-vinyl alcohol copolymer, thereby providing a film which is an aggregate of a first phase comprising particles of ethylene-vinyl alcohol copolymer in a second phase of the compatible polymer or compound with adjacent ethylene-vinyl alcohol copolymer particles being distinct but having a plurality of zones of continuity; and (d) i) collecting the film which has adjacent ethylene-vinyl alcohol copolymer particles which form a network of interconnected micropores therebetween, or ii) extracting the compatible polymer or compound with water and stretching the film in at least one direction while wet to further separate adjacent ethylene-vinyl alcohol copolymer particles from one another and to permanently attenuate the ethylene-vinyl alcohol copolymer in the zones of continuity to form fibrils therebetween and drying, or iii) extracting the compatible polymer or compound with an organic solvent. One preferred commercial source of the ethylene-vinyl alcohol copolymer is Eval Company of America.

When the compatible polymer or compound is removed from the film by extraction with an organic solvent, the film may optionally be stretched in a heated condition before or after removal of the compatible polymer or compound to further separate adjacent ethylene-vinyl alcohol copolymer particles from one another and to permanently attenuate the ethylene-vinyl alcohol copolymer in the zones of continuity to form fibrils therebetween. Preferably, the compatible polymer or compound is a polyhydric alcohol.

The thus-formed EVOH microporous film is inherently hydrophilic, can have porosity in the range of about 10 to 75 percent, and possesses good tensile properties.

The formed film, before removal of the compatible polymer or compound and stretching, is generally transparent or translucent, and comprises an aggregate of a first phase of particles of EVOH in a second phase of the compatible polymer or compound. The particles may be described as spherulites and aggregates of spherulites of the polymer, with the compatible polymer or compound occupying the space between particles as described with regard to Shipman, supra.

On stretching, the copolymer particles are pulled apart, permanently attenuating the copolymer in zones of continuity, thereby forming the fibrils and creating a network of interconnected micropores. Such permanent attenuation also renders the film permanently translucent or opaque. Also on stretching, if the compatible polymer or compound is not removed, the compatible polymer or compound remains coated on or surrounds, at least partially, the surfaces of the resultant EVOH particles. Substantially all of the particles appear to be connected by fibrils.

The size of the micropores is easily controlled by varying the degree of stretching, the amount of compatible polymer or compound employed, melt-quench conditions, compatible polymer or compound removal, and heat stabilization procedures. For the most part, the fibrils do not appear to be broken by stretching, but they are permanently stretched beyond their elastic limit so that they do not elastically recover to their original position when the stretching force is released. As used herein, "stretching" means such stretching beyond the elastic limit so as to introduce permanent set or elongation of the film.

The ethylene-vinyl alcohol copolymers may be random, block or graft copolymers preferably having an ethylene unit content of about 20 to 90 mol percent, more preferably about 25 to 50 mol percent. The degree of saponification of the copolymer is preferably at least about 80 mol percent, more preferably at least about 95 mol percent, based on the vinyl alcohol units in the copolymer. An insufficient degree of saponification may result in insufficient wet mechanical properties for some purposes. Preferably, the number average molecular weight of the ethylene-vinyl alcohol copolymer is at least about 2000 g/mol, more preferably at least about 20,000 g/mol, most preferably at least about 40,000 g/mol with higher molecular weight copolymers frequently exhibiting better processing and strength characteristics.

The ethylene and vinyl alcohol monomers may be copolymerized with another copolymerizable monomer such as methacrylic acid, vinyl chloride, methyl methacrylate, acrylonitrile and vinyl pyrrolidone to form a terpolymer with the amount of copolymerizable monomer being less than about 15 mol percent. Where a functional group is present as a result of the copolymerizable monomer in the terpolymer, the functional group can serve to provide sites for crosslinking. Crosslinkages may be introduced into the ethylene-vinyl alcohol copolymers or terpolymers by irradiation such as, for example, ultraviolet, electron beam or gamma irradiation. Crosslinkages may also be introduced into the ethylene-vinyl alcohol copolymers before or after membrane formation by treatment with an inorganic crosslinking agent such as a boron compound or an organic crosslinking agent such as a diisocyanate or a dialdehyde. Such crosslinking agents also may be included in the melt blend as long as the phase separation is not adversely affected. Useful ethylene-vinyl alcohol copolymers also include those in which the functional hydroxyl groups of vinyl alcohol units are partially crosslinked with an aldehyde such as formaldehyde, acetaldehyde, butyraldehyde or benzaldehyde but preferably to an extent of not more than about 30 mol percent.

Compounds suitable for blending with the ethylene-vinyl alcohol copolymer to make the microporous materials are liquids or solids at room temperature, in which the copolymer will dissolve to form a solution at the melting temperature of the copolymer, but will phase separate on cooling at or below the crystallization temperature of the copolymer. Preferably, these compounds have a boiling point at atmospheric pressure at least as high as the melting temperature of the ethylene-vinyl alcohol copolymer. However, compounds having lower boiling points may be used in those instances where superatmospheric pressure may be employed to elevate the boiling point of the compound to a temperature at least as high as the melting temperature of the crystallizable polymer. Generally, suitable compounds have a solubility parameter and a hydrogen bonding parameter within a few units of the values of these same parameters for the crystallizable polymer.

Suitable compounds for blending with the ethylene-vinyl alcohol copolymers include, for example, polyhydric alcohols such as polyethylene glycol, polypropylene glycol, ethylene glycol, triethylene glycol, and glycerin. Preferably, the polyhydric alcohol has a number average molecular weight below about 600 g/mol to provide sufficient compatibility with the ethylene-vinyl alcohol copolymer.

A particular combination of copolymer and compatible polymer or compound may include more than one copolymer, i.e., a blend of two or more copolymers and/or more than one compatible polymer or compound. Optionally, if desired, the copolymer may include blended therein certain conventional additive materials, which materials should be limited in quantity so as not to interfere with the formation of the microporous material and so as not to result in unwanted exuding of the additive. Such additives may include, for example, antistatic materials, antioxidants, dyes, plasticizers, elastomers, ultraviolet light absorbers, and the like. When used, the amount of such conventional additive is typically less than about 10% of the weight of the copolymer component, and preferably less than about 2% by weight.

The melt blend preferably comprises from about 30 to about 80 parts by weight of the ethylene-vinyl alcohol copolymer and about 20 to about 70 parts by weight of the compatible polymer or compound, more preferably from about 40 to about 70 parts by weight of the ethylene-vinyl alcohol copolymer and about 30 to about 60 parts by weight of the compatible polymer or compound. The ethylene-vinyl alcohol copolymer and the compatible polymer or compound are preferably heated to at least the melting temperature of the melt blend and preferably to a temperature in the range of about 10° to 100° C. above the melt temperature of the melt blend for ease of handling of the melt.

The EVOH films useful in the present invention may be prepared by casting a shaped film such as a sheet or layer from the melt blend comprising the ethylene-vinyl alcohol copolymer and the compatible polymer or compound. Depending upon the particular copolymer employed, the film is cooled in a quench bath at an appropriate temperature, preferably at least about 60° C. below the equilibrium melting point of the pure copolymer, to provide a proper cooling rate. For example, for ethylene-vinyl alcohol copolymer melt blend having an equilibrium melting point of 175° C., a cooling temperature between about 40° C. and about 120° C. or more is employed. Some minor degree of experimentation may be required to identify the appropriate temperature range which produces optimum phase separation for a particular copolymer/compatible polymer or compound system, this being well within the capability of those skilled in the art once apprised of the present disclosure.

The attainment of the EVOH microporous films is dependent upon the rate of cooling. During cooling, heat is removed from the melt blend until the crystallization temperature of the ethylene-vinyl alcohol copolymer in the melt blended mixture is reached, and solidification and phase separation of the copolymer can begin. Cooling temperatures greater than about 160° C. below the equilibrium melting point of the pure copolymer may cause too rapid quenching of the melt blend and can result in single phase form, which, although strong and transparent, are substantially incapable of being rendered uniformly microporous by stretching.

The EVOH microporous membranes or films can be prepared using the procedure described in Shipman, supra, with regard to FIG. 1 of Shipman. The cooled film may then be led from the quench wheel to a compatible polymer or compound removal bath containing water or another solvent capable of dissolving the compatible polymer or compound but not the ethylene-vinyl alcohol copolymer, if removal of the compatible polymer or compound is desired. The film, when water is used as the extraction bath, preferably is then directed to a machine-direction stretching device and a transverse direction stretching device, and then to a take-up roller for winding into a roll. Where a solvent other than water is used to remove the compatible polymer or compound, the film may be dried prior to stretching and then stretched in a heated condition, e.g., from about 70° C. to 140° C. Stretching in two directions as done by the apparatus of FIG. 1 of Shipman is, of course, optional.

A further method of forming a membrane material from the blended melt includes casting the extruded melt onto a patterned chill roll to provide areas where the blend does not contact the chill roll to provide a membrane of substantially uniform thickness having a patterned surface, the patterned surface providing substantially skinless areas having high microporosity and skinned areas of reduced microporosity. Such a method is described in U.S. Pat. No. 5,120,594 (Mrozinski) which is incorporated by reference herein. Alternatively, the membrane material may be cast onto a wheel coated with the compatible polymer or compound used to form the melt blend. The membrane material can then be extracted and oriented, i.e., stretched, as described above.

The porosity of the microporous films can be increased by stretching, typically with an increase in length (elongation) of about 10%. Stretching to provide a total area increase of about 10% to about 1200% is generally useful. The actual amount of stretching required will depend upon the particular composition of the film and the degree of porosity desired. Stretching may be provided by any suitable device which can provide stretching in at least one direction, and may provide stretching both in that direction and in the transverse direction. Stretching should be uniform to obtain uniform and controlled porosity.

The microporous sheet materials of the present invention are preferably dimensionally stabilized according to conventional, well known techniques, such as by heating the stretched sheet, while it is restrained, at a heat stabilizing temperature.

If the microporous film of the invention is dried but not annealed, i.e., subjected to a heat treatment, it is dimensionally stable as long as the film is kept in equilibrium by constant temperature and humidity. Dimensional stability under conditions of changing temperature and humidity can be improved with higher annealing temperatures. Shrinkage when exposed to heat or water is a feature which can make the microporous film useful for moisture indicating or for forcing another compound from the pores of the film after exposure. For some applications, it may be preferable to avoid curling caused by mismatched dimensional changes of the microporous film and optional release liner under heat and humidity. This can be accomplished by selecting the release liner and microporous film to have substantially equal expansivity properties.

The films of the present invention generally possess sufficient tensile strength for subsequent handling, depending upon the tensile strength of the ethylene-vinyl alcohol copolymer employed, the zones of continuity, the extent of stretching, and the various process conditions.

The compatible polymer or compound may be removed from the microporous sheet to provide a unique microporous sheet material formed only of the ethylene-vinyl alcohol copolymeric material. Removal of the polyhydric alcohol may be accomplished by extraction, volatilization, or any other convenient method. The preferred extraction solvents include water and organic solvents such as, for example, isopropyl alcohol, ethanol, methanol, n-butanol, hydrochlorofluorocarbons, acetone, methyl ethyl ketone and 1,1,1-trichloroethane.

The operation of the present invention will be further described with regard to the following detailed examples. These examples are offered to further illustrate the various specific and preferred embodiments and techniques. It should be understood, however, that many variations and modifications may be made while remaining within the scope of the present invention.

EXAMPLES

In describing the examples, the following terms will be used. The Gurley value is an indication of the porosity of the microporous film 12, and is measured according to ASTM D-726-58 (1971), Method A, "Standard Methods of Test for Resistance of Paper to Passage of Air". The Gurley value is a measurement of the amount of time it takes to force a known quantity of air through the film under controlled conditions. Porosity is also indicated by a value expressed as percent porosity, which is determined by dividing the measured density of the polymeric microporous film by the bulk density of the polymer, and subtracting that ratio from 1. Bubble point is an indication of the diameter of the pores of the microporous film, and is measured in accordance with ASTM F 316-86, "Standard Test Methods for Pore Size Characteristics of Membrane Filters by Bubble Point and Mean Flow Pore Test." This test determines how much pressure is required to force a given volume of gas through the microporous film after prewetting the film. This time is used to calculate the flow-limiting diameter of the pores.

Example 1

A brittle microporous film comprising a 0.1 mm (0.004 in) thick film of EVOH having a Gurley value of 26.5 sec., a 0.66 micrometer pore size as determined by the bubble point, and a porosity of 51.8% was used to fabricate the label. A 0.05 mm (0.002 in) thick layer of pressure sensitive adhesive comprising an Acrylic 300 adhesive from Minnesota Mining and Manufacturing Company, St. Paul, Minn. was used. First or authenticating indicia 18 comprising a water insoluble ink commercially available as Flexo Poly Reflex Blue FA 20775 from Flint Ink was printed on first major surface 14 of microporous film 12. Second, or tamper-indicating indicia 20 was provided by incorporating 0.3% by weight red dye solvent powder 027 available from Spectra into the adhesive. Water was used to transparentize the microporous film to reveal the authenticating indicia, without causing the tamper-indicating indicia to bleed through to second major surface 16 of the microporous film. When the water evaporated, the film returned to its opaque state. Toluene, methyl ethyl ketone, and methanol were each applied to the label as would be done in an attempt to remove the adhesive bond to a substrate. Each solvent caused the second indicia to bleed through to the exposed surface of the label, providing a permanent indication of tampering.

Example 2

Example 2 was prepared according to Example 1, except that solvent blue 97 dye, available from Spectra was used as second indicia 20. The label of Example 2 performed as reported with reference to Example 1.

Example 3

A brittle microporous film comprising a 0.1 mm (0.004 in) thick film of polypropylene with the oil removed from the pores, having a Gurley value of 3 sec., a 1.24 micrometer pore size as determined by the bubble point, and a porosity of 80% was used to fabricate the label. A 0.05 mm (0.002 in) thick layer of pressure sensitive adhesive comprising an Acrylic 100 adhesive from Minnesota Mining and Manufacturing Company, St. Paul, Minn. was used. In this embodiment, the same indicia performed as both the authenticating indicia and the tamper-indicating indicia. Indicia 18 comprising an ink commercially available as Flexo Fluorescent Red FA-22838 from Flint Ink was printed on first major surface 14 of microporous film 12. Trichloroethylene was used to transparentize the microporous film to reveal the authenticating indicia, without causing the tamper-indicating indicia to bleed through to second major surface 16 of the microporous film. When the trichloroethylene evaporated, the film returned to its opaque state. Methanol, acetone, and methyl ethyl ketone solvents were each applied to the label and each caused the indicia to bleed through to second surface 16 of film 12, providing a permanent indication of tampering.

Example 4

Example 4 was prepared according to Example 3, except that Flexo 466-U Brown RVN-24853 from Flint Ink was used for the indicia. The label of Example 4 performed as reported with Example 3.

Example 5

A stretchy microporous film comprising a 0.09 mm (0.0035 in) thick film of polyethylene with the oil removed from the pores, having a Gurley value of 18 sec., a 0.41 micrometer pore size as determined by the bubble point, and a porosity of 77% was used to fabricate the label. A 0.05 mm (0.002 in) thick layer of pressure sensitive adhesive comprising an Acrylic 100 adhesive from Minnesota Mining and Manufacturing Company, St. Paul, Minn. was used. The label of Example 5 was prepared with indicia and tested with the same results as reported with Example 3.

Example 6

A stretchy microporous film comprising a 0.025 mm (0.001 in) thick film of polypropylene with the oil left in the pores, having a Gurley value of 184 sec., a 0.29 micrometer pore size as determined by the bubble point, and a porosity of 20% was used to fabricate the label. A 0.05 mm (0.002 in) thick layer of pressure sensitive adhesive comprising an Acrylic 100 adhesive from Minnesota Mining and Manufacturing Company, St. Paul, Minn. was used. The label of Example 6 was prepared with indicia and tested with the same results as reported with Example 3.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. For example, although the label has been described herein as having the indicia and adhesive applied directly to the first major surface of the microporous film, it is understood that an additional substrate can be bonded to the first surface of the microporous film, and that the indicia can be on either or both of the film and the substrate. Thus, the scope of the present invention should not be limited to the exact details and structures described herein, but rather by the structures described by the language of the claims, and the equivalents of those structures.

What is claimed is:

1. An authenticatible, tamper-indicating label, comprising:

a normally opaque, transparentizable microporous film having first and second major surfaces, a first indicia proximate send first surface a second indicia on said first surface, and an adhesive proximate said first surface;

wherein said microporous film can be changed from an opaque state to a transparent state by application of a first liquid that is not a solvent for said first and second indicia to said microporous film to thereby sufficiently fill the pores of said microporous film to cause said film to become transparent;

wherein when said microporous film is in its opaque state, said first and second indicia are not visually perceptible when said label is viewed from said second surface, and when said microporous film is in its transparent state, at least said first indicia is visually perceptible when said label is viewed from said second surface, thereby providing an indication of the authenticity of said label; and wherein application of a second liquid that is a solvent for said second indicia causes at least a portion of said second indicia to migrate through said microporous film to said second major surface, thereby providing a permanent visually perceptible indication of tampering.

2. The label of claim 1, wherein said second indicia is soluble in hydrocarbons.

3. The label of claim 1, wherein said second indicia is soluble in ketones.

4. The label of claim 1, wherein said second indicia is soluble in alcohols.

5. The label of claim 1, wherein the application of a volatile liquid causes said first indicia to be temporarily visually perceptible through said microporous film, thereby providing a temporary indication of the authenticity of said label.

6. The label of claim 1, wherein said first indicia is insoluble in water, such that said first indicia does not migrate through said microporous film upon application of water to said label.

7. The label of claim 1, wherein said first indicia is insoluble in trichloroethylene, such that said first indicia does not migrate through said microporous film upon application of trichloroethylene to said label.

8. The label of claim 1, wherein said microporous film can be changed from said opaque state to said transparent state by an application of heat to a sufficiently high temperature to said label so as to collapse the pores of said microporous film, thereby causing said second indicia to be permanently visually perceptible through said microporous film when viewed from the second surface to provide a permanent indication of tampering.

9. The label of claim 1, wherein said microporous film comprises a polymeric film including a plurality of interconnected pores therein and a plurality of polymeric particles interconnected by fibrils extending between adjacent particles.

10. The label of claim 9, wherein said polymeric material comprises polypropylene.

11. The label of claim 9, wherein said polymeric material comprises polyethylene.

12. The label of claim 9, wherein said polymeric material comprises ethylene vinyl alcohol copolymer.

13. The label of claim 1, wherein said adhesive includes said second indicia.

14. The label of claim 1, wherein said microporous film has a tensile strength of at least 750 psi and exhibits at least 100% tensile elongation at tensile failure.

15. The label of claim 1, wherein said microporous film has a tensile strength of at least 1200 psi and exhibits at least 200% tensile elongation at tensile failure.

16. The label of claim 1, wherein said microporous film has a tensile strength of no greater than 3500 psi and exhibits no more than 30% tensile elongation at tensile failure.

17. The label of claim 16, wherein said microporous film has a tensile strength of no greater than 1000 psi and exhibits no more than 20% tensile elongation at tensile failure.

18. The label of claim 1, wherein said first indicia is distinct from said second indicia.

19. An authenticatible, tamper-indicating label, comprising:

a normally opaque, transparentizable microporous film having first and second major surfaces, a combined indicia proximate said first major surface, and an adhesive proximate said first surface;

wherein said microporous film can be changed from an opaque state to a transparent state by application of a first liquid that is not a solvent for said combined indicia to said microporous film to thereby sufficiently fill the pores of said microporous film to cause said film to become transparent; and wherein when said microporous film is in its opaque state, said combined indicia is not visually perceptible when said label is viewed from said second surface, and when said microporous film is in its transparent state, said combined indicia is visually perceptible when said label is viewed from said second surface, thereby providing an indication of the authenticity of said label; and wherein application of a second liquid that is a solvent for said combined indicia causes at least a portion of said combined indicia to migrate through said microporous film to said second major surface, thereby providing a permanent visually perceptible indication of tampering.

20. An authenticatible, tamper indicating system, comprising:

a) an article having an exposed surface;

b) an authenticatible, tamper-indicating label adhered to said article, said label including a normally opaque, transparentizable microporous film having first and second major surfaces and an adhesive, wherein said label is adhered to said exposed surface of said article with a first bond strength by said adhesive such that said first major surface is facing said article; and c) first indicia and second indicia, wherein said first indicia is located in said system such that when said microporous film is in its opaque state, said first indicia is not visually perceptible when said label is viewed from said second surface, and when said microporous film is in its transparent state, said first indicia is visually perceptible when said label is viewed from said second surface, and wherein said second indicia is located on said first major surface of said film;

wherein said microporous film can be changed from an opaque state to a transparent state by application of a first liquid that is not a solvent for said first and second indicia to said microporous film to thereby sufficiently fill the pores of said microporous film to cause said film to become transparent;

wherein when said microporous film is in its opaque state, said first and second indicia are not visually perceptible when said label is viewed from said second surface, and when said microporous film is in its transparent state, at least said first indicia is visually perceptible when said label is viewed from said second surface, thereby providing an indication of the authenticity of said label;

wherein application of a second liquid that is a solvent for said second indicia to said label causes at least a portion of said second indicia to migrate through said microporous film to said second major surface, thereby providing a permanent visually perceptible indication of tampering, and wherein said microporous film has a tensile strength greater than said first bond strength, and wherein said microporous film exhibits at least 100% elongation at tensile failure.

21. The system of claim 20, wherein said microporous film exhibits at least 200% elongation at tensile failure.

22. An authenticatible, tamper indicating system, comprising:

a) an article having an exposed surface;

b) an authenticatible, tamper-indicating label adhered to said article, said label including a normally opaque, transparentizable microporous film having first and second major surfaces and an adhesive, wherein said label is adhered to said exposed surface of said article with a first bond strength by said adhesive such that said first major surface is facing said article; and c) first indicia and second indicia, wherein said first indicia is located in said system such that when said microporous film is in its opaque state, said first indicia is not visually perceptible when said label is viewed from said second surface, and when said microporous film is in its transparent state, said first indicia is visually perceptible when said label is viewed from said second surface, and wherein second indicia is located on said first major surface of said film;

wherein said microporous film can be changed from an opaque state to a transparent state by application of a first liquid that is not a solvent for said first and second indicia to said microporous film to thereby sufficiently fill the pores of said microporous film to cause said film to become transparent;

wherein when said microporous film is in its opaque state, said first and second indicia are not visually perceptible when said label is viewed from said second surface, and when said microporous film is in its transparent state, at least said first indicia is visually perceptible when said label is viewed from said second surface, thereby providing an indication of the authenticity of said label;

wherein application of a second liquid that is a solvent for said second indicia to said label causes at least a portion of said second indicia to migrate through said microporous film to said second major surface, thereby providing a permanent visually perceptible indication of tampering; and wherein said microporous film has a tensile strength less than said first bond strength, and wherein said microporous film exhibits no more than 30% elongation at tensile failure.

23. The system of claim 22, wherein said microporous film exhibits no more than 20% elongation at tensile failure.

* * * * *

UNITED STATES PATENT AND TRADEMARK OFFICE

CERTIFICATE OF CORRECTION

PATENT NO. : 5,660,925
DATED : August 26, 1997
INVENTOR(S) : Julian B. Cooley and Henry B. Clark It is certified that error appears in the above-identified patent and that said Letters Patent is hereby corrected as shown below:

Column 23,
Line 1, "wherein second" should read --wherein said second--.

Signed and Sealed this

Third Day of July, 2001

*Attest:*

Nicholas P. Godici

*Attesting Officer*

NICHOLAS P. GODICI
*Acting Director of the United States Patent and Trademark Office*